US006223278B1

United States Patent
Morrison

(12)
(10) Patent No.: US 6,223,278 B1
(45) Date of Patent: Apr. 24, 2001

(54) METHOD AND APPARATUS FOR FLOATING POINT (FP) STATUS WORD HANDLING IN AN OUT-OF-ORDER (OOO) PROCESSOR PIPELINE

(75) Inventor: Michael J. Morrison, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/187,719

(22) Filed: Nov. 5, 1998

(51) Int. Cl.[7] ................................................ G06F 15/00
(52) U.S. Cl. ............................ 712/227; 712/217; 712/23
(58) Field of Search .................................. 712/2 B, 217, 712/218, 222, 227, 200, 228

(56) References Cited

U.S. PATENT DOCUMENTS

| 4,914,581 | * | 4/1990 | Talgam et al. ................... 340/146.2 |
| 5,546,551 | * | 8/1996 | Kohn ................................... 707/102 |
| 5,826,070 | * | 10/1998 | Olson et al. ........................ 712/222 |
| 6,021,488 | * | 1/2000 | Eisen et al. ........................ 712/228 |
| 6,032,249 | * | 2/2000 | Olson et al. ........................ 712/200 |
| 6,061,786 | * | 5/2000 | Witt .................................... 712/237 |

* cited by examiner

Primary Examiner—Larry D. Donaghue
(74) Attorney, Agent, or Firm—Blakely, Sokoloff, Taylor & Zafman LLP

(57) ABSTRACT

A method for performing floating point (FP) instruction handling is provided. A floating point store status word (FSTSW) instruction is inserted within a plurality of micro-ops corresponding to a plurality of FP instructions and the plurality of micro-ops are ordered for execution. In another aspect, a processor is provided for executing a plurality of floating point (FP) instructions. The processor includes a fetcher/decoder unit to retrieve a plurality of FP instructions from a memory structure and generate a plurality of micro-ops from the FP instructions. The processor further generates a floating point store status word (FSTSW) instruction and includes a scheduler unit to re-order the micro-ops for execution.

23 Claims, 3 Drawing Sheets

METHOD AND APPARATUS FOR FLOATING POINT (FP) STATUS WORD HANDLING IN AN OUT-OF-ORDER (OOO) PROCESSOR PIPELINE

BACKGROUND OF THE INVENTION

1. Field of the Invention

The present invention relates generally to the execution of instructions in a computer processor, and, more particularly, to a method and apparatus for floating point (FP) status word handling in an out-of-order (OOO) processor pipeline.

2. Description of the Related Art

With the increasing complexity of computer applications to meet the demands of the computer user, the number of instructions to be carried out by a computer's processor is significantly increasing as well. Accordingly, with the growing number of instructions to be carried out, it is desirable to execute these instructions in the most expedient manner possible in order to optimize system performance.

Floating point (FP) instruction sets, when executed in a processor pipeline, include a status word (FPSW) that contains information regarding the execution of older instructions, and is used to make decisions for future flow of instructions within the processor pipeline. The status information provided by the FPSW is "sticky" in nature, i.e., it is the sum of the execution of all previous instructions. However, in an out-of-order (OOO) processor pipeline, where these FP instructions are executed out-of-order, determining the status of these instructions becomes more complicated.

A simplistic approach to solve this problem is to add additional micro-code to each FP instruction to explicitly create a status word. However, this approach is not an optimal solution, especially since the status is sticky and will increase the number of micro-instructions (micro-ops) executed within the pipeline (even though there may not be a need for the information contained in the status word). Thus, this approach would increase the number of micro-instructions handled by the processor pipeline, thus decreasing the efficiency of the pipeline.

Another approach may be to block the reading of the status word at the instruction renamer unit until all earlier micro-instructions have retired. However, if such an approach is taken, it would directly affect the amount of time for the execution of these instructions, since all future activity is waiting on such execution. Thus, this approach will also impede the execution of these instructions, thereby decreasing the performance of the processor pipeline.

The present invention is directed to overcoming, or at least reducing the effects of, one or more of the problems set forth above.

SUMMARY OF THE INVENTION

In one aspect of the present invention, a method for performing floating point (FP) instruction handling is provided. A floating point store status word (FSTSW) instruction is inserted within a plurality of micro-ops corresponding to a plurality of FP instructions and the plurality of micro-ops are ordered for execution.

In another aspect of the present invention, a processor is provided for executing a plurality of floating point (FP) instructions. The processor includes a fetcher/decoder unit to retrieve a plurality of FP instructions from a memory structure and generate a plurality of micro-ops from the FP instructions. The processor further generates a floating point store status word (FSTSW) instruction and includes a scheduler unit to re-order the micro-ops for execution.

BRIEF DESCRIPTION OF THE DRAWINGS

Other objects and advantages of the invention will become apparent upon reading the following detailed description and upon reference to the drawings in which.

Figure 1:
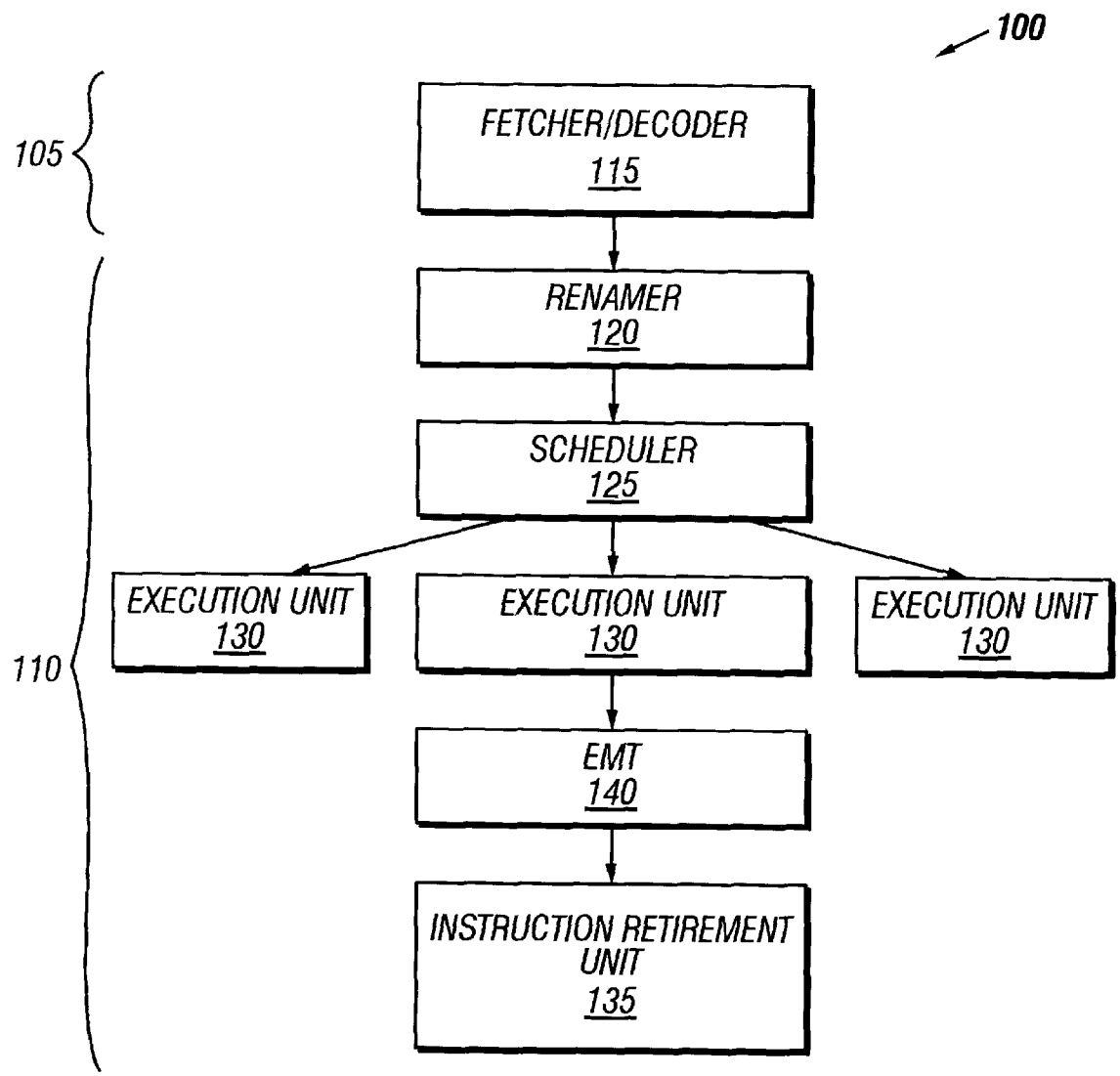
FIG. 1 illustrates a processor pipeline in which the present invention may be implemented in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nonetheless be a routine undertaking for those of ordinary skill in the art having the benefit of this disclosure.

Turning now to the drawings, and specifically referring to FIG. 1, a processor pipeline 100, in which the present invention may be implemented, is shown in accordance with an embodiment. The pipeline 100 transports instructions that are to be carried out by a processor (not shown), and arranges the instructions in a particular ordering such that they are handled by the processor in a more expedient manner. The different types of instructions that are transported through the pipeline 100 are varied. For example, the instruction types may include floating point (FP), integer, store, and load instructions, as well as other types of instructions. In accordance with the illustrated embodiment of the present invention, however, the execution of floating point (FP) instructions within the pipeline 100, and the status of their execution, will be discussed below.

The pipeline 100 includes a front end 105 and a back end 110. The front end 105 of the pipeline 100 includes a fetcher/decoder unit 115, which fetches these FP instructions from a memory structure such as memory addresses (not shown). In one embodiment, the memory may be an instruction cache (not shown), which stores the FP instructions sequentially in a set of registers (also not shown). The fetcher/decoder unit 115 further decodes the FP instructions into "simpler" micro-operations (commonly known as "micro-ops" or "syllables"). A micro-op is generally a single transaction that may be executed by the processor in a single clock cycle. However, in some embodiments, some FP instructions may include two or more micro-ops. Thus, there may not necessarily be a one-to-one correspondence between the FP instructions and the micro-ops.

In the front end 105 of the pipeline 100, the FP instructions are in a Von Neumann order (a sequential "program" order) as they are fetched sequentially from the instruction cache. Once the micro-ops are generated by the fetcher/decoder 115, the micro-ops pass to the back end 110 of the pipeline 100 and enter into a renamer unit 120. The renamer unit 120 renames a particular destination register for the micro-ops such that they can be executed in any order, i.e., not necessarily in the original "program" order when these instructions were first introduced to the front end 105 of the pipeline 100.

Subsequent to exiting the renamer unit 120, the micro-ops are sent to a scheduler 125, which determines when the micro-ops will be executed by the processor. The scheduler 125 re-orders the micro-ops based on information such as input data dependencies, operation latency, and execution resource availability. At this point in the pipeline 100, the micro-ops usually become out-of-order (OOO) as a result of the scheduler 125 deciding which micro-ops should execute before the other micro-ops.

Subsequent to the scheduler 125 re-ordering the micro-ops, the re-ordered micro-ops are delivered to a plurality of execution units 130, which execute the micro-ops. The execution units 130 further write to and read from various registers (not shown) through various "functional unit ports" in the respective register files.

The back end 110 of the pipeline 100 further includes an instruction retirement unit (IRU) 135, which "retires" the micro-ops when executed properly by the execution units 130. That is, when a micro-op is executed properly, it is no longer needed, and, thus can be retired. The IRU 135 enforces the original Von Neumann "program" order of the FP instructions, which may have been completed out-of-order by the execution units 130. However, an improperly executed micro-op (e.g., a micro-op encountering an exception or branch misprediction) needs to be retained for re-execution by the execution units 130.

Figure 2:
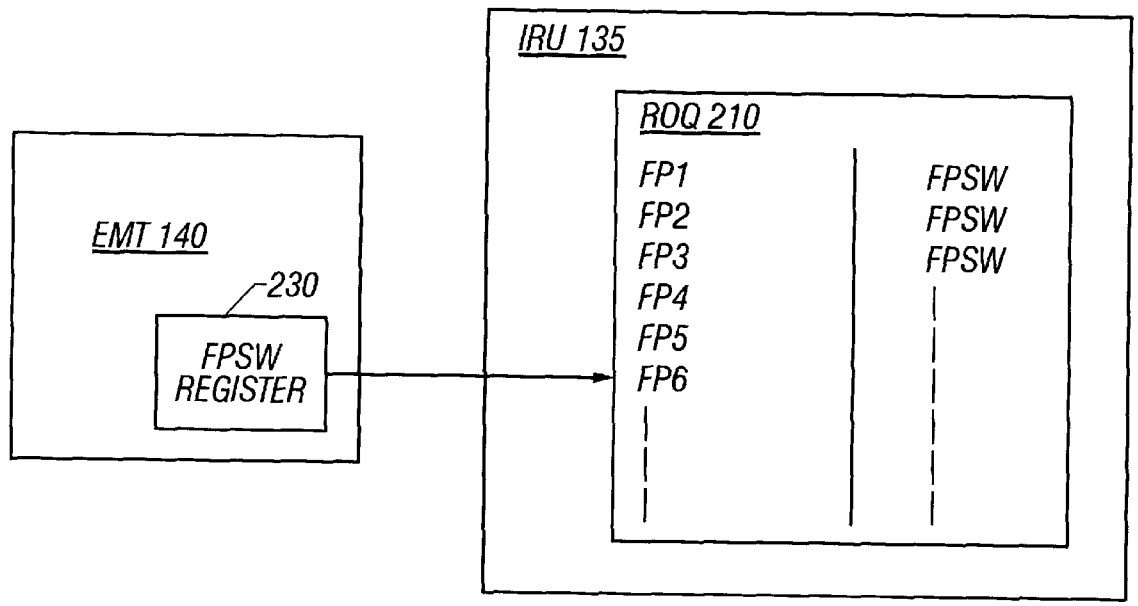
FIG. 2 shows a detailed view of the instruction retirement unit (IRU) of the processor pipeline of FIG. 1.

Turning now to FIG. 2, a more detailed diagram of the IRU 135 is shown. The IRU 135 includes, among other components, a re-order queue (ROQ) 210, which stores the FP micro-ops in the original "program" order and a floating point status word (FPSW) corresponding to the FP micro-ops. The FPSW indicates whether or not corresponding FP micro-ops executed properly. That is, it provides information on whether or not particular micro-ops encountered an exception or branch misprediction, for example, when executed by one of the execution units 130. Every FP instruction logs its status information in the re-order queue (ROQ) 210 as it executes in the pipeline 100. The ROQ 210 maintains the architectural FP status word (FPSW) by updating the FPSW as the IRU 135 retires the various FP instructions in program order.

As illustrated in FIGS. 1 and 2, an enhanced mode tracking (EMT) unit 140, which resides earlier in the pipeline 100 than the IRU 135, provides FP status information to the ROQ 210 of the IRU 135 and tracks the execution of the micro-ops. The EMT unit 140 modifies the ROQ 210 as the micro-ops complete execution by the execution units 130 via a status register 230. That is, as a micro-op completes execution within the pipeline 100, the EMT unit 140 latches on to the micro-op along with its status and writes the micro-op's status into the ROQ 210 as the FPSW. The EMT unit 140 also sets a completion status bit for properly executed micro-ops, which the IRU 135 uses to determine which of the micro-ops are eligible for retirement.

As the EMT unit 140 writes this status information into the ROQ 210, the EMT unit 140 maintains its own copy of the FPSW as well. The copy of the FPSW in the EMT unit 140 is updated with the information brought back for every floating point operation from the pipeline 100.

Figure 3:
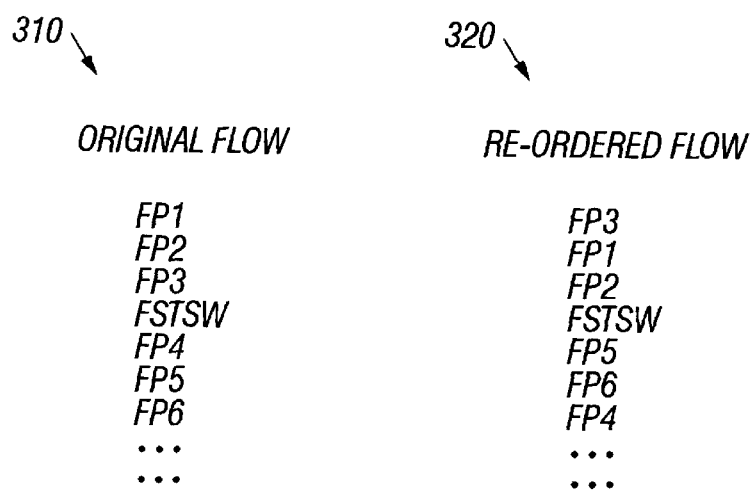
FIG. 3 shows the flow for particular floating point instructions through the processor pipeline of FIG. 1 according to a Von Neumann program order and a re-ordered flow of instructions.

Turning now to FIG. 3, an "original" flow (first order) of the FP micro-ops as they flow through the pipeline 100 and exit the fetcher/decoder unit 115 is shown at 310. In the original flow, the micro-ops are in sequential order (the original Von Neumann program order) as the FP instructions are retrieved from the instruction cache and the micro-ops are generated by the fetcher/decoder unit 115. In the illustrated embodiment, the micro-ops are arranged in a set or grouping of three micro-ops (e.g., FP1–FP3, FP4–FP6, etc.). However, the number of micro-ops in each set or grouping may include any number of micro-ops, and, thus, is not necessarily limited to three.

In accordance with an embodiment of the invention, a floating point store status word (FSTSW) instruction follows any arbitrary number of instructions. The FSTSW instruction is a command to store to and/or read from the FPSW for each micro-op in the ROQ 210 to indicate the execution status of the FP micro-ops.

When the FP micro-ops are passed to the back end 110 of the pipeline 100 and into the scheduler 125, the micro-ops are re-ordered (into a second order) as shown at 320 in FIG. 3. As previously mentioned, the ordering of the micro-ops by the scheduler 125 could include input data dependencies between the micro-ops, operation latency, and execution resource availability of the execution units 130. However, such re-ordering by the scheduler 125 need not necessarily be limited to the aforementioned criteria.

As is conventional in the art, when these FP micro-ops of the re-ordered flow 320 exit the scheduler 125, the micro-ops are executed by the execution units 130 in the re-ordered (out-of-order) flow. That is, in the particular example as shown in 320, the micro-op FP3 is executed prior to the micro-op FP1, which is executed prior to micro-op FP2 by the execution units 130.

In operation, the FSTSW instruction would read the FPSW corresponding to a micro-op when the IRU 135 was queried. However, since the IRU 135 retires these out-of-order micro-ops in program order (the ordering FP1–FP3), the FSTSW cannot read the FPSW until all "older" micro-ops have retired. Thus, the IRU 135 cannot be queried for the value of the FPSW until the full retirement of the micro-ops FP1–FP3 by the IRU 135. That is, referring to the re-ordered flow of micro-ops 320, the FPSW of micro-op FP3 cannot be ascertained until micro-ops FP1 and FP2 have been retired by the IRU 135, even though the micro-op FP3 was the first to be executed from this group of micro-ops. This becomes a greater problem if any of the micro-ops of the "second" grouping (FP4–FP6) appear in the "first" grouping of the re-ordered flow 320. It is conceivable that the micro-op FP5 could have been the first micro-op in the re-ordered flow to be executed, in which case, the FPSW of FP5 could not be ascertained until the retirement of all the micro-ops FP1–FP5.

To overcome, or reduce the effects of, the aforementioned problems associated with reading the FPSW of the micro-ops in an expedient manner, and in accordance with the present invention, no FP micro-op "younger" than the FSTSW instruction may bypass another grouping of micro-ops even if it is not dependent on any of the micro-ops in the previous grouping. Essentially, the FSTSW is treated as a "fence" between the sets or groups of micro-ops, and the re-ordering of these micro-ops (the re-ordered flow 320) from the original program order (the original flow 310) is limited to within its particular grouping or set prior to re-ordering by the scheduler 125. This will be better understood from the following description as set forth below.

Referring again to FIG. 3, in accordance with an embodiment of the present invention, the micro-ops of the first set (FP1–FP3) of the original flow 310 are not re-ordered outside of the first set of micro-ops in the re-ordered flow 320 by the scheduler 125. Each set of micro-ops is established by the "boundary" of the FSTSW instruction in the original 310 and re-ordered 320 flow of micro-ops. Thus, in the re-ordered flow 320 of micro-ops, any FP micro-op "younger" than the FSTSW instruction would not advance the FSTSW instruction even if such "younger" micro-op is not dependent on any one of the micro-ops before the FSTSW instruction. Accordingly, the FSTSW instruction acts as a "fence" between the sets of micro-ops (FP1–FP3, FP4–FP6) of the original flow 310 of micro-ops. Further, the micro-ops of any one set or grouping of the original flow 310 would not be re-ordered to another set or grouping in the re-ordered flow 320.

When the re-ordering of micro-ops is constrained to their original set, performance of the pipeline 100 is increased by reading the FPSW of the micro-ops from the EMT unit 140 as opposed to the ROQ 210 within the IRU 135. Since the EMT unit 140 resides earlier in the pipeline 100 than the IRU 135, and since several clocks can elapse between the completion of a micro-op and its retirement in the IRU 135, the FSTSW instruction reads the copy of the FPSW in the EMT unit 140. The advantage of reading the FPSW from the EMT unit 140 as opposed to the ROQ 210 will be further appreciated from the example provided below.

Referring again to the re-ordered flow 320 of micro-ops in FIG. 3, when the micro-op FP3 is executed and comes back with its FPSW, the EMT unit 140 records the status in its status register 230. Subsequently, the micro-op FP1 is the next micro-op to return from the pipeline 100 with an FPSW status. The micro-op FP1 is older than the micro-op FP3 (according to the original flow 310), which was the first operation to be executed by the execution unit 130 in the re-ordered flow 320.

In accordance with the present invention, the EMT unit 140 will not update its own copy of the FPSW with regard to the micro-op FP1, since the micro-op FP1 is older than the micro-op FP3. It will only update the exception flags of the micro-op FP1 as they are considered "sticky". Similarly, when the execution of the micro-op FP2 occurs, the EMT unit 140 will also reject the status flags for the micro-op FP2 and the FPSW for the micro-op FP2 will not be updated, but the exception flags for the micro-op FP2 will be merged as they are considered "sticky". Accordingly, when the FSTSW instruction is read, the correct FPSW will be read from the EMT unit 140 without the need to wait for the entire retirement of the set of micro-ops FP1–FP3.

In one particular embodiment, if there is an exception or branch misprediction on either the FP1 or the FP2 micro-ops, the instruction/micro-code flow will be re-steered at the time of the retirement of the corresponding micro-op. At this point, the IRU 135 will send its copy of the correct FPSW to the EMT unit 140 to update the status register 230.

Figure 4:
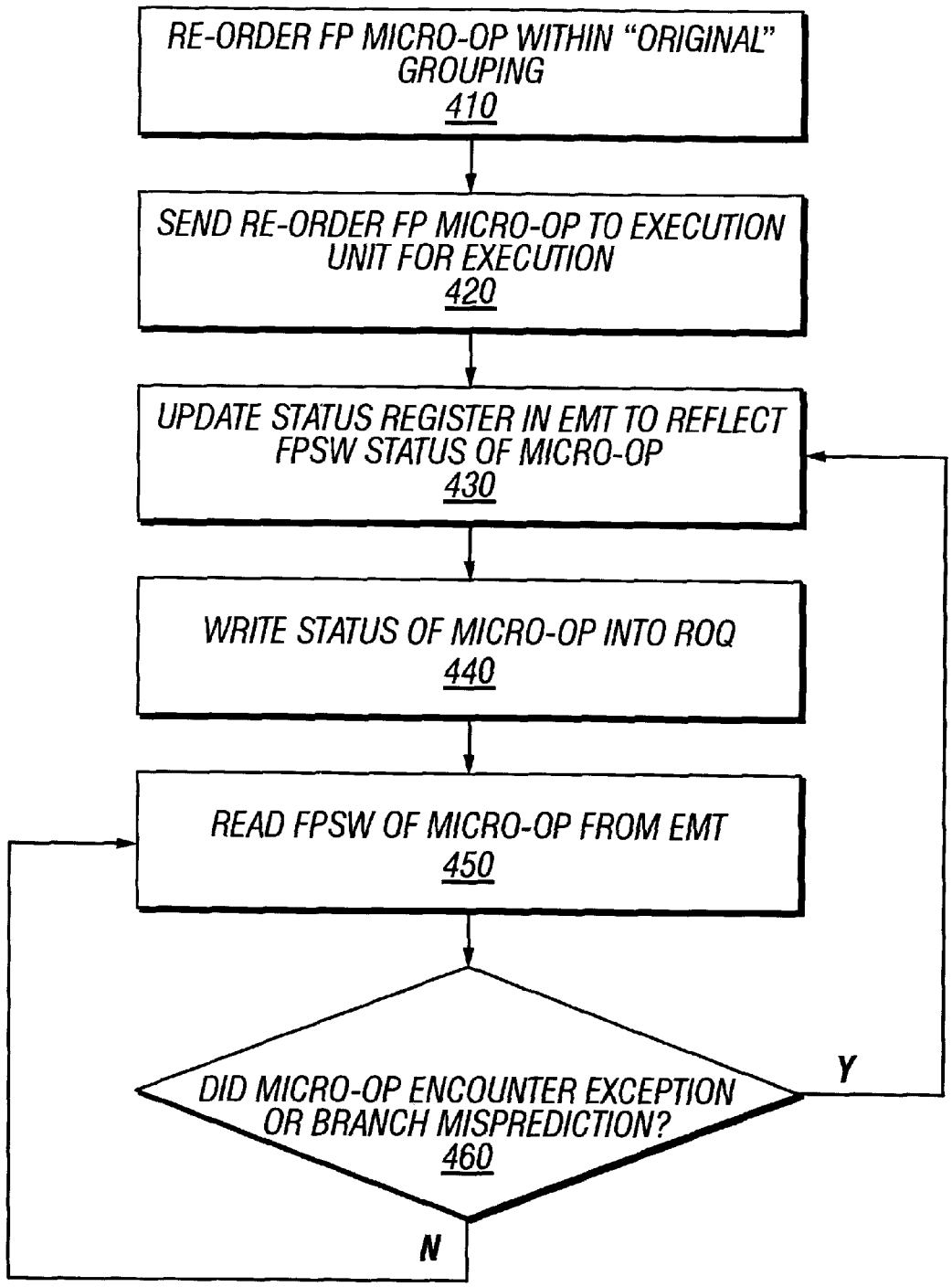
FIG. 4 shows a flowchart depicting a process carried out within the pipeline of FIG. 1 in accordance with an embodiment of the present invention.

Turning now to FIG. 4, a process 400 for performing floating point (FP) status word handling for floating point instructions, in accordance with the present invention, is shown. The process 400 commences at step 410 where the FP micro-ops are re-ordered from their original program order 310 by the scheduler 125. As previously mentioned, the micro-ops are re-ordered by the scheduler 125 within their original grouping or set. In accordance with an embodiment, the FSTSW instruction acts as a "boundary" or "fence" to distinguish one set or grouping of micro-ops from another. Thus, the FP micro-ops of the original program flow 310 are re-ordered such that no FP micro-op "younger" than a particular FSTSW instruction will be able to "advance" such FSTSW instruction in the re-ordered program flow 320.

Subsequent to the re-ordering of the FP micro-ops by the scheduler 125, the process 400 continues to step 420, where the re-ordered FP micro-ops are sent to the execution units 130 for execution. The process 400 then continues to step 430, where the EMT unit 140 updates its status register 230 corresponding to the first FP micro-op of the re-ordered flow 320. Next, at step 440, the EMT unit 140 writes the FPSW status of the first micro-op in the ROQ 210 of the IRU 135.

When the FSTSW instruction appears in the re-ordered flow 320, the FPSW is read from the EMT unit 140 at step 450. At step 460, if the micro-op encountered an exception or branch misprediction, the process 400 reverts back to step 430, where the EMT unit 140 updates its status register 230 to reflect such.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:
   receiving a plurality of micro-ops corresponding to a plurality of floating point instructions and a floating point store status word instruction in a first order;
   defining a first group of said plurality of micro-ops including each of said plurality of micro-ops occurring before said floating point store status word instruction in said first order;
   defining a second group of said plurality of micro-ops including each of said plurality of micro-ops occurring after said floating point store status word instruction in said first order; and
   re-ordering said plurality of micro-ops and said floating point store status word instruction into a second order, wherein no micro-op from said second group occurs before said floating point store status word instruction in said second order.

2. The method as set forth in claim 1, wherein re-ordering comprises re-ordering said plurality of micro-ops and said floating point store status word instruction into a second order, wherein no micro-op from said first group occurs after said floating point store status word instruction in said second order.

3. The method as set forth in claim 2, further comprising generating a floating point status word corresponding to said plurality of floating point instructions.

4. The method as set forth in claim 3, further comprising:
executing said floating point store status word instruction; and
reading said floating point status word in response to said execution.

5. The method as set forth in claim 3, wherein generating a floating point status word comprises:
executing a first micro-op of said plurality of micro-ops;
generating a floating point status word in response to said execution of said first micro-op;
executing a second micro-op of said plurality of micro-ops; and
updating said floating point status word in response to said execution of said second micro-op.

6. The method as set forth in claim 5, wherein updating said floating point status word comprises:
determining whether said second micro-op occurs after said first micro-op in said first order; and
updating said floating point status word in response to a determination that said second micro-op occurs after said first micro-op in said first order.

7. The method as set forth in claim 5, wherein executing said first micro-op and said second micro-op comprises sending said first micro-op and said second micro-op to an execution unit to be executed in said second order.

8. The method as set forth in claim 4, wherein generating a floating point status word comprises storing said floating point status word within an enhancement mode tracking unit.

9. The method as set forth in claim 8, wherein reading said floating point status word further comprises reading said floating point status word from said enhancement mode tracking unit in response to said execution.

10. The method as set forth in claim 8, further comprising maintaining an architectural floating point status word corresponding to said plurality of floating point instructions within an instruction retirement unit.

11. The method as set forth in claim 10, wherein generating a floating point status word comprises:
detecting an exception in response to an execution of one of said plurality of micro-ops; and
updating said floating point status word utilizing said architectural floating point status word in response to said detection.

12. A processor comprising:
a fetcher/decoder unit to retrieve a plurality of floating point instructions from a memory structure, and to generate a plurality of micro-ops utilizing said plurality of floating point instructions and a floating point store status word instruction having a first order, said plurality of micro-ops including a first group including each of said plurality of micro-ops occurring before said floating point store status word instruction in said first order; and a second group of said plurality of micro-ops including each of said plurality of micro-ops occurring after said floating point store status word instruction in said first order; and
a scheduler unit to re-order said plurality of micro-ops and said floating point store status word instruction into a second order, wherein no micro-op from said second group occurs before said floating point store status word instruction in said second order.

13. The processor as set forth in claim 12, wherein said scheduler unit comprises a scheduler unit to re-order said plurality of micro-ops and said floating point store status word instruction into a second order, wherein no micro-op from said first group occurs after said floating point store status word instruction in said second order.

14. The processor as set forth in claim 13, further comprising an enhancement mode tracking unit to generate a floating point status word corresponding to said plurality of floating point instructions.

15. The processor as set forth in claim 14, further comprising:
an execution unit to execute a first micro-op and a second micro-op of said plurality of micro-ops in said second order; wherein said enhancement mode tracking unit comprises
an enhancement mode tracking unit to generate a floating point status word in response to an execution of said first micro-op, to determine whether said second micro-op occurs after said first micro-op in said first order, and to update said floating point status word responsive to a determination that said second micro-op occurs after said first micro-op in said first order.

16. The processor as set forth in claim 14, further comprising:
an execution unit to execute said floating point store status word instruction and to provide said floating point status word in response to said execution.

17. The processor as set forth in claim 16, further comprising an instruction retirement unit to maintain an architectural floating point status word corresponding to said plurality of floating point instructions.

18. A computer system comprising:
a memory structure including a plurality of floating point instructions; and
a processor, said processor comprising:
a fetcher/decoder unit to retrieve said plurality of floating point instructions and to generate a plurality of micro-ops utilizing said plurality of floating point instructions and a floating point store status word instruction having a first order, said plurality of micro-ops including a first group including each of said plurality of micro-ops occurring before said floating point store status word instruction in said first order; and a second group of said plurality of micro-ops including each of said plurality of micro-ops occurring after said floating point store status word instruction in said first order; and
a scheduler unit to re-order said plurality of micro-ops and said floating point store status word instruction into a second order, wherein no micro-op from said second group occurs before said floating point store status word instruction in said second order.

19. The computer system as set forth in claim 18, wherein said scheduler unit comprises a scheduler unit to re-order said plurality of micro-ops and said floating point store status word instruction into a second order, wherein no micro-op from said first group occurs after said floating point store status word instruction in said second order.

20. The computer system as set forth in claim 19, said processor further comprising an enhancement mode tracking unit to generate a floating point status word corresponding to said plurality of floating point instructions.

21. The computer system as set forth in claim 20, said processor further comprising:
- an execution unit to execute a first micro-op and a second micro-op of said plurality of micro-ops in said second order; wherein said enhancement mode tracking unit comprises
  - an enhancement mode tracking unit to generate a floating point status word in response to an execution of said first micro-op, to determine whether said second micro-op occurs after said first micro-op in said first order, and to update said floating point status word responsive to a determination that said second micro-op occurs after said first micro-op in said first order.

22. The computer system as set forth in claim 20, said processor further comprising:
- an execution unit to execute said floating point store status word instruction and to provide said floating point status word in response to said execution.

23. The computer system as set forth in claim 22, said processor further comprising an instruction retirement unit to maintain an architectural floating point status word corresponding to said plurality of floating point instructions.

* * * * *